United States Patent [19]

Fuller, Jr. et al.

[11] Patent Number: 4,643,621
[45] Date of Patent: Feb. 17, 1987

[54] QUICK-CHANGE SYSTEM FOR POWER FEED AND POSITIVE FEED DRILL MOTORS

[75] Inventors: Robert L. Fuller, Jr., Issaquah; Dwayne E. Proff, Puyallup, both of Wash.

[73] Assignee: The Boeing Company, Seattle, Wash.

[21] Appl. No.: 477,564

[22] Filed: Mar. 21, 1983

[51] Int. Cl.⁴ .............................................. B23Q 11/10
[52] U.S. Cl. ..................... 408/57; 279/1 B; 279/20; 408/59; 408/239 A; 408/241 R
[58] Field of Search ............... 408/56, 57, 61, 59, 408/60, 239 R, 239 A, 241 R; 279/81, 75, 20, 1 B; 81/442; 409/134, 135, 136

[56] References Cited

U.S. PATENT DOCUMENTS

| | | | |
|---|---|---|---|
| 2,339,324 | 1/1944 | Fischer | 408/56 |
| 2,873,632 | 2/1959 | Bissey | 408/57 |
| 2,912,887 | 11/1959 | Andreasson | 408/57 |
| 3,229,427 | 1/1966 | Goodhew | 408/57 X |
| 3,313,186 | 4/1967 | Rochon | 408/59 X |
| 3,543,613 | 12/1970 | Obloy | 408/57 |
| 3,791,660 | 2/1974 | Bostley | 408/59 X |
| 4,113,405 | 9/1978 | Dillinger | 408/57 X |
| 4,188,041 | 2/1980 | Soderberg | 279/81 X |
| 4,197,886 | 4/1980 | MacDonald | 81/442 |
| 4,388,028 | 6/1983 | Bodin | 408/59 X |
| 4,396,317 | 8/1983 | Staron et al. | 408/59 |

*Primary Examiner*—Gil Weidenfeld
*Assistant Examiner*—Glenn L. Webb
*Attorney, Agent, or Firm*—Conrad O. Gardner; B. A. Donahue

[57] ABSTRACT

A quick-change system for power feed and positive feed drill motors having quick-change capabilities whereby a nosepiece may be separated from the drill motor employing a quick-release coupling that does not utilize threaded means. The quick-change system utilizes a quick-change nosepiece, chuck and shank adapter means such that the oil line to a fluid inducer remains attached during nosepiece removal.

1 Claim, 3 Drawing Figures

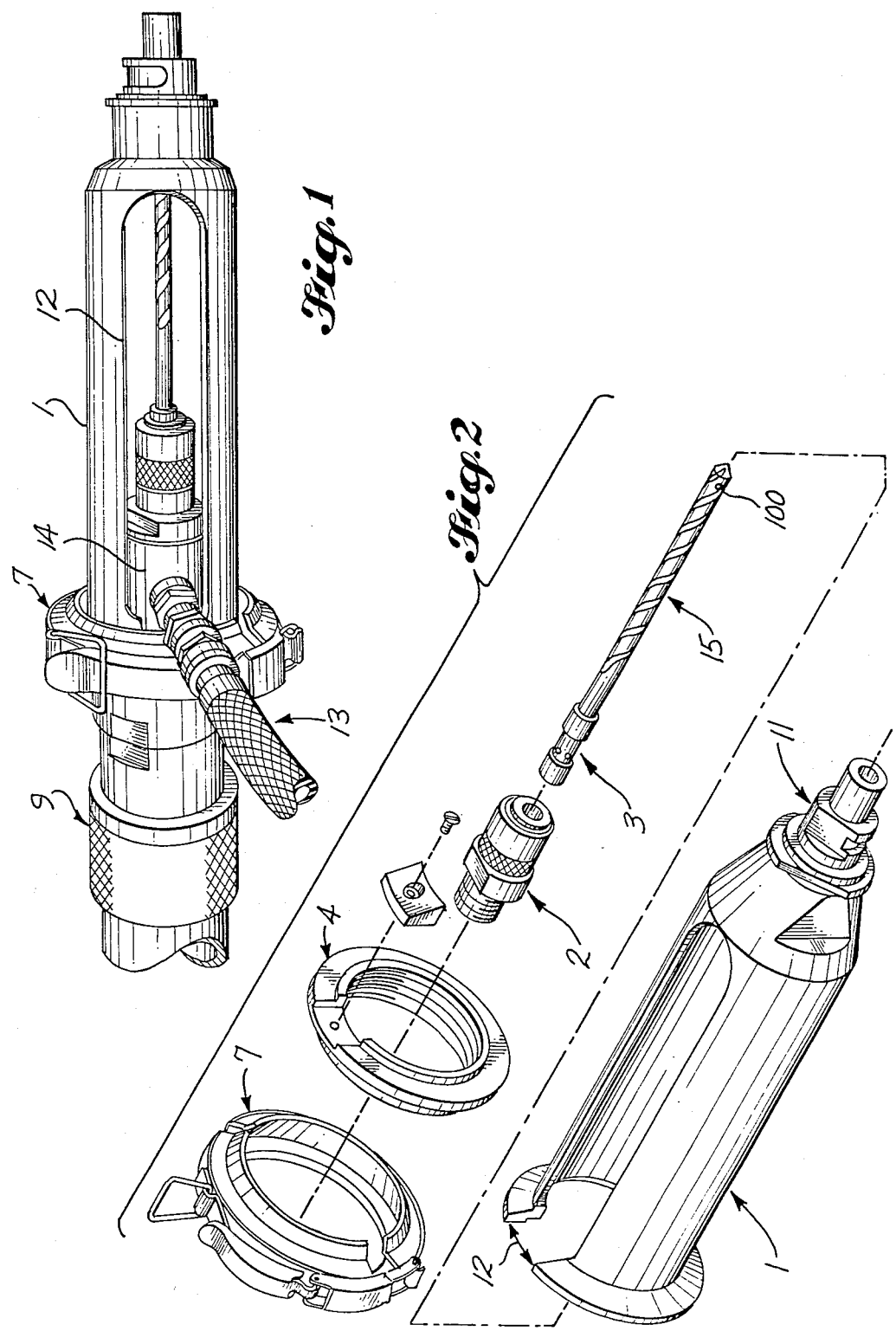

QUICK-CHANGE SYSTEM FOR POWER FEED AND POSITIVE FEED DRILL MOTORS

This invention relates to motor quick-change chuck systems for tools having cylindrically-shaped tool shank adapters, and, more particularly, to a motor quick-change chuck system including a nosepiece for permitting the cutting oil line to remain on the drill chuck while disconnecting the nosepiece from the drill motor.

Heretofore, power feed and positive feed drill motors have required a nosepiece for locking the drill motor to a drilling plate, a fluid inducer which couples the drill or reamer to the drill motor and through which the cutting oil is introduced and fed to the drill or reamer which reamer and drills contained oil holes and were attached to the fluid inducer by means of a threaded shank adapter. To change a drill or reamer, most of these elements were required to be separated, a task which was labor intensive due to the threaded means of fastening employed.

It is accordingly an object of the present invention to provide a quick-change system for power feed and positive feed drill motors having a rapid tool change system.

In current state-of-the-art efforts, if an oil hole drill or reamer is required to be removed from a power feed or positive feed drill motor, the operator is required to: disconnect the oil line to the fluid inducer, unlock the nosepiece from the drilling plate, unscrew the nosepiece from the drill motor, and unscrew the drill or reamer from the fluid inducer. The reverse of this tedious process is required when installing the replacement tool. The procedure is slow because of the several threaded connections.

Exemplary of the patent literature showing drill apparatus having various types of couplings and connections permitting change of various drill elements are U.S. Pat. Nos. 4,197,886 and 2,452,386.

It is, accordingly, a further object of the present invention to provide means in a quick-change system for power feed and positive feed drill motors which includes circumferential clamping for providing disassembly of the drill guide from the drive motor, thereby permitting rapid drill change.

It is yet another object of the present invention to provide ring clamping means for holding a drill motor body to a nosepiece in a manner allowing the cutting oil line to remain on the drill chuck while disconnecting the nosepiece from the drill motor.

The invention, together with other objects and features thereof, will be more clearly understood when the following description is read in connection with the accompanying drawings in which:

FIG. 1 is a perspective view of a quick-change system for power feed and positive feed drill motors in accordance with a preferred embodiment of the present invention;

FIG. 2 is an exploded perspective view showing the quick-change system for power feed and positive feed drill motors of FIG. 1 disassembled; and, FIG. 3 is a cross-sectional view of the quick-change system for power feed and positive feed drill motors shown in FIG. 1.

Figure 3:
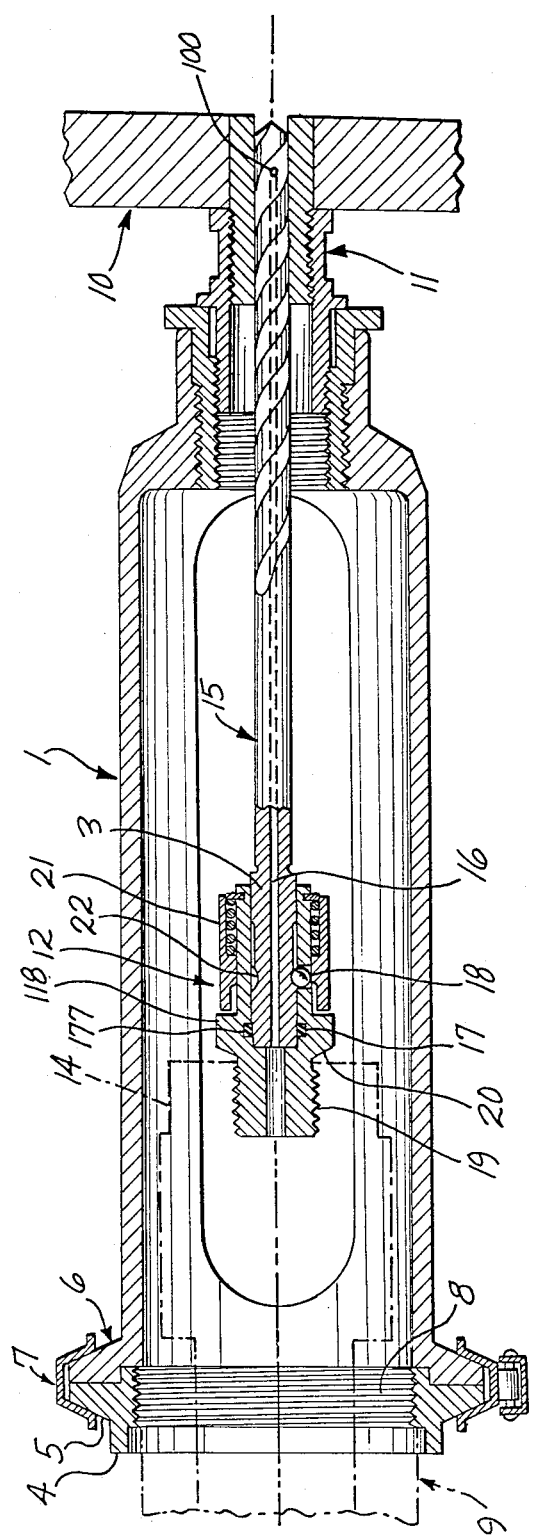

Turning now to FIG. 1, it will be noted that the the present quick-change system for power feed or positve feed drill motor 9 includes a cutting oil line 13 coupled through an axially disposed elongated slot 12 in nosepiece member 1 to internally disposed fluid inducer member 14.

Turning now to FIGS. 2 and 3, it will be seen that the present quick-change system for power feed and positive feed drill motors includes quick-change nosepiece member 1, a quick-change chuck 2, and a quick-change shank adapter 3. Quick-change chuck 2 corresponds identically with chuck 12 of FIGS. 2 and 4 shown in U.S. Pat. No. 4,188,041, also assigned to The Boeing Company, herein incorporated by reference, with the exception of actually disposed circumferential slot 177 disposed on the inner cylindrical surface of cylindrically-shaped body member 118 (denoted as numeral 18 in FIG. 4 of aforementioned U.S. Pat. No. 4,188,041). Actually disposed circumferential slot 177, as seen hereinafter, is utilized to seat O-ring seal member 17 therein upstream of detente balls 18 to provide an oil-tight seal when quick-change chuck adapter 3 is inserted into quick-change chuck 2, for instance, as seen in FIG. 3. Quick-change adapter 3, shown herein in FIGS. 2 and 3, is identical to adaptor 26 of hereinbefore mentioned U.S. Pat. No. 4,188,041 except that quick-change chuck adapter 3, as seen in the present application in FIG. 3, includes a coaxially disposed hole 16 which extends through the rear portion of adapter 3 to provide an oil passage between fluid inducer 14 and exit aperature 100 in the forward end of drill 15.

Nosepiece member 1, as seen in FIG. 3, comprises first and second cylindrically-shaped members 1 and 4, having corresponding mating of flange portions 5 and 6, mating flange portions 5 and 6 being locked together by means of quick-release coupling 7, viz. toggle release ring clamping means. Nosepiece adapter flange member 5 includes an internal threaded surface 8 for threading onto and coupling to power feed or positive feed drill motor 9. For subsequent assembly and disassembly, only quick-release coupling means 7 is required to be actuated by the operator since, in contrast to the hereinbefore described prior art, there is no requirement for the operator to use a screwing action or maneuver in order to separate nosepiece member 1 from locking drill bushing 11 while removing drill motor 9. Nosepiece member 1, as hereinabove described, includes an axially disposed elongated slot portion 12 which permits cutting oil line 13 to remain coupled to internally disposed fluid inducer means 14 during nosepiece separations. Oil hole reamers and drills 15 are thus seen to provide oil passage exit through coaxially disposed hole 16 in adapter 3 from fluid inducer 14 located downstream. Quick-change chuck 2, utilized with quick-change drills 15 is seen to include an internally disposed O-ring seal member 17 upstream of detente balls 18 for providing an oil tight seal when the quick-change oil hole adapter 3 is snapped into quick-change chuck 2. Quick-change chuck 2 is also seen to include a threaded end portion 19 (seen in FIG. 3) and circumferentially disposed tapered seating portion 20 which allows quick-change chuck 2 to attach to fluid inducer means 14 and prevent oil leakage. Release of quick-change chuck adapter member 3 from quick-change chuck 2 is accomplished by sliding spring-loaded sleeve 21 (as shown in the sliding action of FIG. 4 at collar member 32 of U.S. Pat. No. 4,188,041) which allows detente balls 18 to disengage from detente holes 22 equiangularly disposed about the outer circumference of quick-change adaptor 3.

DESCRIPTION OF OPERATION

To gain access to tool 15, nosepiece member 1 can remain locked to drilling plate 10, and cutting oil inlet line 13 can remain attached to fluid inducer 14. By actuating quick-release coupling means 7, power feed drill motor 9, along with attached fluid inducer 14, quick-change chuck 2, quick-change adapter 3 which drives tool 15, can all be removed as a unit from nosepiece member 1. Cutting oil inlet line 13 is free to move with fluid inducer means 14 because of axially disposed elongated slot 12 in nosepiece member 1. To remove tool 15, the operator actuates quick-change chuck 2, thereby releasing quick-change adapter 3 along with attached tool 15.

We claim:

1. In combination:

a tool having a cylindrically-shaped adapter portion;

a tool-holding chuck assembly having a first end portion adapted for coupling to a motor and a second end portion for receiving said cylindrically-shaped adapter portion;

a cylindrically-shaped nosepiece member coaxially disposed about the central axis of said tool-holding chuck assembly;

said cylindrically-shaped nosepiece member having an elongated axial slot;

a cylindrically-shaped nosepiece adapter flange coaxially disposed about the central axis of said tool-holding chuck assembly, said cylindrically-shaped nosepiece adapted flange having an internally threaded coaxially disposed inner wall surface threaded for mating threaded coupling to said motor;

a fluid inducer disposed within said cylindrically-shaped nosepiece member;

a fluid coupling path coupled between said fluid inducer and said tool, said fluid coupling path extending through said tool-holding chuck assembly;

a cutting oil line extending through said elongated axial slot to said fluid inducer; and, quick-release coupling means coaxially disposed about said cylindrically-shaped nosepiece member and said cylindrically-shaped nosepiece adapter flange for locking said cylindrically-shaped nosepiece adapter flange and said cylindrically-shaped nosepiece member together.

* * * * *